United States Patent

[11] 3,581,570

[72] Inventor Edward C. Wortz
 Northridge, Calif.
[21] Appl. No. 665,396
[22] Filed Sept. 5, 1967
[45] Patented June 1, 1971
[73] Assignee The Garrett Corporation
 Los Angeles, Calif.

[54] THERMAL RADIATION SENSOR
 6 Claims, 13 Drawing Figs.
[52] U.S. Cl. .................................................. 73/355R,
 128/2R
[51] Int. Cl. .................................................. G01j 5/06,
 G01k 1/14
[50] Field of Search ........................................... 73/355;
 128/2, 2.1

[56] References Cited
UNITED STATES PATENTS
| | | | |
|---|---|---|---|
| 2,813,203 | 11/1957 | Machler | 73/355X |
| 3,274,994 | 9/1966 | Sturm | 128/2 |
| 3,282,106 | 11/1966 | Barnes | 73/355 |
| 3,309,236 | 3/1967 | Gunji | 73/355X |

Primary Examiner—Louis R. Prince
Assistant Examiner—Frederick Shoon
Attorneys—Orville R. Seidner and H. Vincent Harsha ABSTRACT: An instrument sensor member has positioning means to establish a fixed relationship between the member and a small selected area of a living organism. Thermal radiation flux from the area impinges on a concave surface on the member and is reflected to a radiometer fixed at the focus of the surface. The thermal radiation provides a measure of the temperature of the blood in the vessel or vessels immediately under the surface of the area which may be the tympanic membrane as disclosed herein.

PATENTED JUN 1 1971

*INVENTOR.*
EDWARD C. WORTZ

BY Orville R. Seidner

AGENT

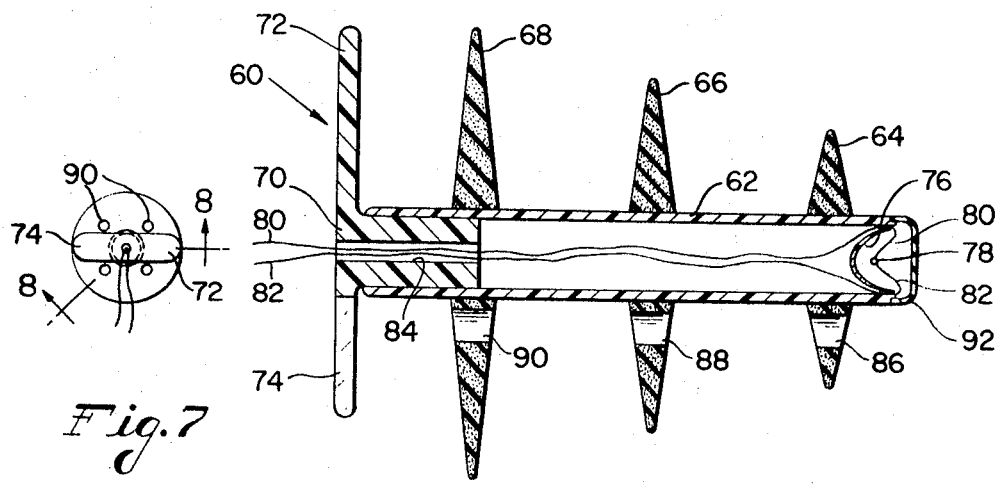
Fig. 7
Fig. 8
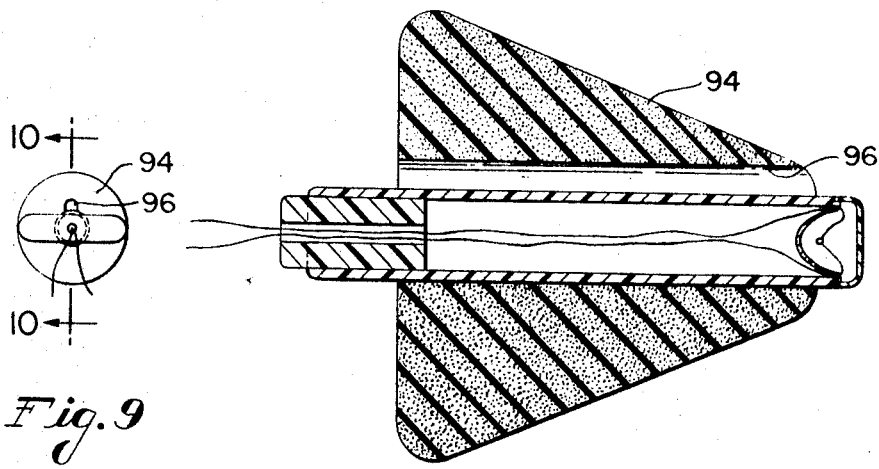
Fig. 9
Fig. 10
INVENTOR.
EDWARD C. WORTZ
BY
AGENT

INVENTOR.
EDWARD C. WORTZ

THERMAL RADIATION SENSOR

BACKGROUND OF THE INVENTION

This invention is directed generally to apparatus, method, and technique of measuring the thermal radiation flux from a small selected area of a living organism, and is more particularly concerned with the measurement of the temperature of the blood coursing the arteries, veins or capillaries immediately underlying the selected area. Specifically, for the instant application of the invention as disclosed herein, the invention is concerned with the measurement of blood temperature by thermal radiation therefrom through the tympanic membrane.

It is already known that the hypothalamus provides the thermoregulatory function of the human body. Furthermore, there is convincing evidence that the hypothalamus is a receptor organ which performs its thermoregulatory function as a consequence of the body temperature sensor "signals" it receives from the blood supplied to it via the carotid artery, and that the temperature regulation occurs at a strictly determined "set point." Since the carotid artery also furnishes the blood supply for the capillary vessels in the tympanic membrane, it has been suggested that a more precise and nearly exact measure of the most meaningful temperature of the human body would be obtained if the measurement were made at the tympanic membrane.

To this end there is known in the prior art a thermometer-like device adapted to be inserted in the external acoustic meatus or ear canal, the end of the device being brought to bear lightly against the tympanic membrane in order to obtain a measure of the temperature thereat by the usual method of direct conduction from the membrane. This prior art device has been employed principally in clinical research programs since it is subject to a number of drawbacks and disadvantages which prevent routine employment at the layman or semiskilled level.

The principal disadvantage of the aforesaid prior art device is that the tympanic membrane is a sensitive tissue, and any foreign object bearing against it results in discomfort and/or pain to the individual, and vertigo for a large percentage of the population, as well as attenuated acoustic response of the eardrum over the entire audible spectrum. Then too, the membrane is easily punctured or other wise injured by the highly localized pressure exerted against it by the small thermistor or thermocouple such as is usually employed, hence the use of the aforesaid device can be made only under very strictly controlled procedures by highly skilled and trained workers.

It will be noted that the employment of any device which depends upon conduction from a tissue surface is made more difficult in the case where the tympanic membrane is the tissue, due to the fact that the ear canal leading to the tissue is narrowest at its middle, and is not at all straight but is directed inward, forward, and upward and then inward and backward to the membrane. Consequently, there is never any assurance that the small thermistor or thermocouple boll is optimally positioned even by trained and highly skilled persons.

SUMMARY OF THE INVENTION

Contrasted with the devices of the prior art, the present invention provides the means and method of sensing the temperature of the blood in the tympanic membrane by radiation therefrom to a radiometer, thereby eliminating all necessity for contact with the membrane. Since the mass of the radiometer is extremely small, the time constant is correspondingly low, of the order of 0.1 second or less. Furthermore, since there is no contact of the membrane by the radiometer, the normal audio function of the ear remains substantially unimpaired. This last mentioned feature is of particular importance in cases where it is desired to communicate orally with the subject, for example by way of a single earphone disposed over the pinna or auricle of the ear within which the radiometer sensor is disposed. In addition, the configuration of the device according to the present invention is such that there is no undesirable discomfort or pain resulting from insertion of the device into the ear canal, and the medical and physiological hazard is eliminated.

It should also be noted that inasmuch as the device utilizes radiation flux to provide the measure, it is independent of environmental atmospheric conditions. Desirably, the wavelength range of the radiation utilized by the device is of the order of 9 to 10 microns, i.e. the infrared range, since it is then possible to detect temperature changes of the order of 0.05° C. Sensitivity of this order is desirable inasmuch as the meaningful temperature differences are very small. In a typical case the maximum temperature variation could be expected to be about 3° C.

BRIEF DESCRIPTION OF THE DRAWINGS

FIG. 7 is an end elevation view of a second embodiment of the invention;

FIG. 8 is a side elevation section view taken on the line 8–8 of FIG. 7, and enlarged about 4×;

FIG. 9 is an end elevation view of a third embodiment of the invention;

FIG. 10 is a side elevation section view taken on the line 10–10 of FIG. 9, and enlarged about 4×;

DESCRIPTION OF THE PREFERRED EMBODIMENTS

Figure 1:
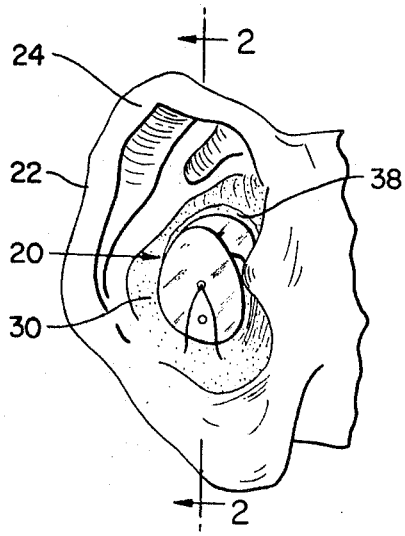
FIG. 1 is a side elevation view, approximately full scale, of a right ear of a human body with one embodiment of the invention disposed therein.
Figure 2:
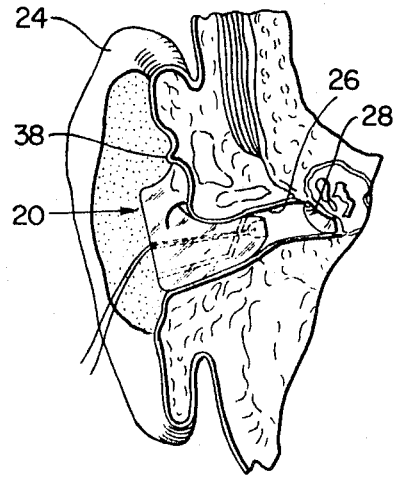
FIG. 2 is a semidiagrammatic section view of the ear anatomy taken generally on the line 2–2 of FIG. 1.

Referring to FIGS. 1 and 2 there is shown an instrument 20 disposed within the right outer ear 22 of a human being. As is well known, the ear 22 comprises the pinna or auricle 24 and the external meatus, or auditory canal 26 across the inner end of which is disposed the tympanic membrane, or eardrum 28. The auricle 24 consists of a plate of elastic cartilage, folded and bent upon itself to form ridges and depressions, one of the ridges defining the concha 30 which is prolonged inward to form the outer two-fifths of the canal 26.

Figure 3:
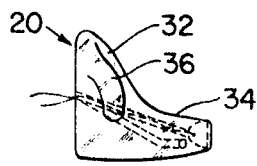
FIGS. 3, 4 and 5 are top, end and side views respectively of the embodiment of the invention.
Figure 4:
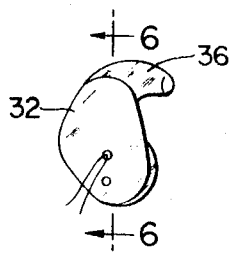
Figure 5:
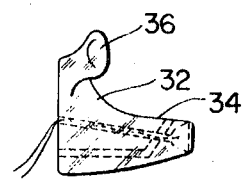

As shown in FIGS. 3—5, the instrument or sensor 20 comprises a body having an enlarged body portion 32 which merges with a reduced section probe portion 34 which is somewhat elongate to lie within the ear canal. The body portion 32 is configured to fit snugly within the concha 30 of the ear, and to that end is provided with a tab 36 which lies within the upper curved portion of the concha and under the partially overlying ridge 38. As is now evident, the sensor 20 is very nearly identical to, and may be easily fabricated along the lines of, the familiar ear mold or earplug which is utilized in the hearing aid art. Preferably, the sensor is fabricated from one of the familiar plastic materials known as Lucite.

Figure 6:
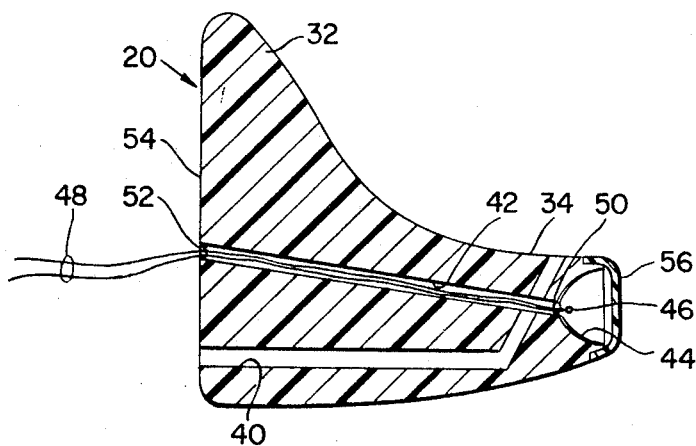
FIG. 6 is an approximate 4× enlarged section view taken on the line 6–6 of FIG. 4.

Two small passageways 40 and 42 traverse the sensor from end to end as best seen in FIG. 6. Passageway 40 is unobstructed to provide ambient air pressure access to the tympanic membrane 28 in cases where the sensor 20 is employed under conditions of changing atmospheric pressure. The distal end of passageway 42 opens on to a chamber defining a concave surface 44 formed in the end of the probe portion 34. Preferably, the surface 44 is paraboloidal with a radiometer 46 disposed at its focus so as to be subject to the radiation flux which is directed on to the surface 44 from the tympanic membrane 28 when the sensor 20 is disposed in the ear as shown in FIG. 2.

As will be appreciated, in order for the surface 44 to function for its intended purpose, it should be highly reflective. To this end it may be coated with a highly reflective coating of gold or aluminum and this may be accomplished by vacuum deposition or sputtering. In the alternative, a thin metal shell of paraboloidal cup may be formed by drawing or casting with the concave surface given a subsequent polishing, after which the shell is cemented or other wise bonded into place within the chamber.

The radiometer 46 may be comprised of a thermistor, bolometer or thermocouple, and is provided with a pair of conductor leads 48 which are disposed in the passageway 42 leading from the radiometer 46 to the exterior of the sensor 20 where the conductors 48 may be coupled to a suitable amplifier and galvanometer means calibrated to read temperature, all as well understood by those skilled in the art and needing no further amplification herein. In order to insure retention of the radiometer 46 at the focus of the surface 44 a small drop of plastic cement 50 or the like is disposed at the inner orifice of the passageway 42. Likewise, another small drop of cement 52 may be disposed adjacent the outer orifice of the passageway to affix the conductors 48 thereat. As an alternative, the conductors 48 may be fixedly disposed within a small plastic tube or sleeve which has a length that extends from the radiometer 46 to the exterior face 54 of the sensor body portion 32. In this case the passageway 42 would have a cross section just slightly larger than that of the exterior of the plastic tube or sleeve to enable the tube and enclosed conductors to be slidably received within the passageway until the radiometer is positioned exactly at the focus of the concave surface 44.

A "window" or transparent shield 56, comprised for example of a polyethylene plastic which transmits infrared radiation flux, may be disposed over the end of the probe portion 34 to protect the radiometer 46 and the reflective surface 44 against hair, earwax or the like.

As depicted in the embodiments of FIGS. 1—6, the sensor 20 is a relatively rigid apparatus configured to fit into the outer ear after the manner of a hearing aid ear mold, and it is now apparent that the body portion 32 and probe portion 34 constitute means for affixedly spacing the concave surface 44 in a predetermined spaced relationship to the tympanic membrane 28. Preferably, of course, the surface 44 should be so disposed as to be subject to radiation flux from substantially only the tympanic membrane, since any radiation from the walls of the inner end of the ear canal would reflect to a large extent the temperature condition of the bony structure surrounding the canal and hence would tend to mask the desired tube reading obtainable from the temperature of the blood in the tympanic membrane. To a large extent, this limitation can be compensated for be designing the paraboloid surface with a configuration which is relatively deep into the probe portion 34 as compared with its open end diameter. Furthermore, compensation may be had by designing the paraboloid surface such that the focus is very close to the vertex of the parabola in which case the radiometer 46 will be subject to only a minimum of stray radiation flux from the wall of the ear canal.

In a typical embodiment the diameter of the "window" of the paraboloid surface would be of the order of 5 mm., and the depth would be about 7 mm.

In the embodiment illustrated in FIGS. 7 and 8 the sensor 60 comprises a hollow elongate tubular member 62 which has a fair degree of rigidity against bending and compressing forces, and which may be comprised of an acrylic or polyvinyl chloride plastic material. Alternatively, the tubular member may be formed of metal tubing or of a hard rubber tubing material. Preferably the tubular member 62 is about 6 mm. in diameter and about 15 mm. long.

Disposed approximately equidistantly along the outer surface of member 62 are three thin flexible rubber discs 64, 66 and 68 of progressively larger diameter from right to left as seen in the Figure. The small disc 64 is preferably about 15 mm. in diameter while the larger disc 68 is about 20 mm. The intermediate disc 66 is sized between that of the other two discs. Secured within one end of the tubular member 62 is plug 70 provided with a pair of radially extending integral tabs 72, 74 which assist with the insertion of the sensor 60 into, and removal from, the ear canal. The plug 70 and integral tabs may be of soft rubber or the like.

Secured within the other end of the tubular member 62 is a paraboloidal shell or cup 76 provided with a polished reflective surface, as described aforesaid in connection with surface 44 of FIG. 6; and disposed at the focus of the cup 76 is a radiometer 78 fixedly secured thereat by its conductors 80, 82 which extend over the front edge of the cup 76 at diametrically opposite points, and back along the inner wall of the tubular member 62. The plug 70 is provided with a passageway 84 from which the conductors 80, 82 emerge for coupling to external apparatus A plurality of pressure-relief passageways 86, 88 and 90 traverse the discs 64, 66 and 68 so that when the sensor 60 is inserted in the ear, there will be no air-bound chamber adjacent the exterior face of the tympanic membrane. This feature permits the sensor 60 to be used in situations where ambient pressure may be fluctuating within relatively wide range limits, as for example in aircraft of other aerospace vehicles.

A polyethylene shield 92 may be disposed over the end of the tubular member 62 to protect the surface of the cup 76 and the radiometer 78.

The sensor 60 is readily insertable into the ear without discomfort on the part of the wearer since the discs 64, 66, 68 are very flexible and tend to accommodate and bend back upon themselves as necessary in order to conform to the restriction and configuration of the ear canal.

The embodiment of FIGS. 9 and 10 is similar to that of FIGS. 7 and 8 with the sole exception that the discs 64, 66 and 68 of the latter are replaced by a closed-cell foam plug 94 which may be fabricated from foamed rubber or polyurethane material. A small passageway 96 traverses the plug 94 from end to end to provide ambient air-pressure relief. As will be noted, the plug 94 is generally frustoconical in configuration so as to be received neatly, firmly and comfortably within the ear canal.

Figure 11:
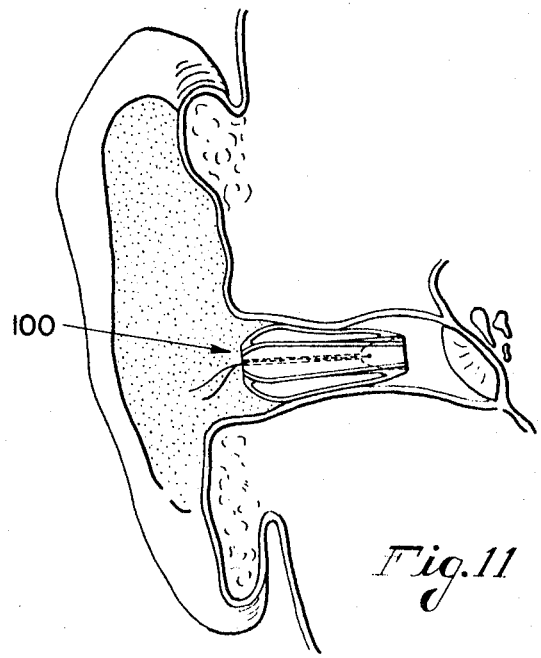
FIG. 11 is another semidiagrammatic section view in elevation, similar to FIG. 2 and showing a fourth embodiment of the invention disposed in a human right ear.
Figure 12:
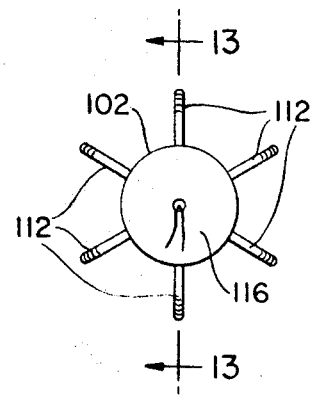
FIG. 12 is an end elevation view of the embodiment illustrated in FIG. 11.
Figure 13:
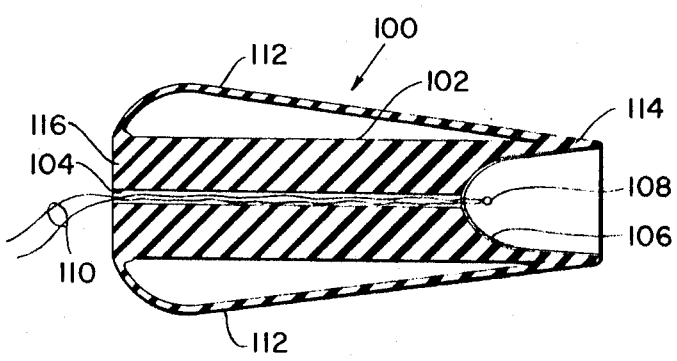
FIG. 13 is a side elevation section view taken on the line 13–13 of FIG. 12.

The structure 100 of the sensor embodiment illustrated in FIGS. 11—13 differs somewhat from the preceding embodiments in that sensor 100 is comprised of the tubular member 102 which may be fabricated of a relatively soft resilient rubber with a small longitudinal tubular passageway 104 opening at one end upon the concave surface 106. A radiometer 108 is disposed at the focus of the portion 106 which is preferably configured as ensuing paraboloid with a coated surface which is highly reflective to thermal radiation flux. Conductor leads 110 in the passageway 104 support the radiometer 108 at one end thereof, the other ends of the conductors being adapted to being coupled to external temperature-indicating apparatus as aforesaid.

Spaced at angular intervals around the outer periphery of the member 102 are a number of rails 112 formed integrally with the member 102. The radially disposed rails 112, shown here as being six in number, extend longitudinally, sloping generally outwardly of the axis of the member 102 from the detector end 114 thereof, joining the distal end 116 as shown.

In a typical embodiment according to FIGS. 12, 13, the tubular member 102 would be about 15 mm. long and about 6 mm. in diameter. The overall diameter across the rails 112 at the greatest distance from the member 102 would be about 10 mm. The rails 112 act as position retention members which by virtue of their collapsible wedging action, as illustrated in FIG. 11, serve to position and retain the sensor 100 in the ear canal.

I claim:

1. A sensor for sensing thermal radiation from a tympanic membrane of a human body, comprising:
   a. sensor body means having an elongate probe portion adapted to be disposed in an ear canal of the human body with one end of said probe portion adjacent a tympanic membrane of the body, said end of said probe portion defining a concave surface;

b. thermal radiation flux converging means on said body means including a radiation reflective surface means on said concave surface adapted to gather thermal radiation flux from a portion of the adjacent tympanic membrane and direct said flux to a small volume of space;

c. a radiometer disposed in said volume of space; and d. spacing means on said sensor body means for affixedly spacing said flux-converging means in a predetermined spaced relationship to the adjacent tympanic membranes such that thermal radiation flux from the adjacent tympanic membrane is converged on said radiometer by said converging means, said spacing means comprising resilient element means disposed exteriorly along said probe portion to engage the ear canal with said probe portion spaced substantially centrally therealong.

2. The sensor of claim 1 in which said reflecting concave surface has the configuration of a paraboloid of revolution, and said radiometer is disposed at the focus thereof.

3. The sensor of claim 1 in which said resilient element means comprise a plurality of thin flexible resilient discs substantially equidistantly spaced along said probe portion.

4. The sensor of claim maker in which said resislient element means comprise a closed-cell foam plug of generally frustoconical configuration.

5. The sensor of claim 1 in which said resilient element means comprise a plurality of soft resilient rails extending longitudinally along said probe portion and spaced radially outwardly therefrom.

6. Apparatus for sensing thermal radiation from a tympanic membrane of a human body, comprising:

a. body means having an elongate probe portion adapted to be disposed in an ear canal of the human body with one end of said probe portion adjacent a tympanic membrane of the body, said body means having a cup-shaped chamber with an opening adjacent said one end of said probe portion, said chamber having a surface reflective to thermal radiation.

b. a radiometer disposed in said chamber and spaced from said opening; said surface reflecting radiation from said opening onto said radiometer, and c. means for shielding said radiometer from heat radiation emitted by said ear canal.

UNITED STATES PATENT OFFICE
CERTIFICATE OF CORRECTION

Patent No. 3,581,570          Dated June 1, 1971

Inventor(s) Edward C. Wortz

It is certified that error appears in the above-identified patent and that said Letters Patent are hereby corrected as shown below:

Column 6, line 1, change "maker" to --1--; same line correct spelling of "resilient"

Signed and sealed this 28th day of March 1972.

(SEAL)
Attest:

EDWARD M. FLETCHER, JR.          ROBERT GOTTSCHALK
Attesting Officer                    Commissioner of Patents